(12) United States Patent
Utsunomiya

(10) Patent No.: US 11,250,603 B2
(45) Date of Patent: Feb. 15, 2022

(54) MEDICAL IMAGE DIAGNOSTIC APPARATUS AND MEDICAL IMAGE DIAGNOSTIC METHOD

(71) Applicant: Toshiba Medical Systems Corporation, Otawara (JP)

(72) Inventor: Mio Utsunomiya, Nasushiobara (JP)

(73) Assignee: Canon Medical Systems Corporation, Otawara (JP)

(*) Notice: Subject to any disclaimer, the term of this patent is extended or adjusted under 35 U.S.C. 154(b) by 28 days.

(21) Appl. No.: 15/230,575

(22) Filed: Aug. 8, 2016

(65) Prior Publication Data

US 2017/0186200 A1 Jun. 29, 2017

(30) Foreign Application Priority Data

Dec. 24, 2015 (JP) .............................. JP2015-252216

(51) Int. Cl.
  *G06T 11/60* (2006.01)
  *G06T 7/33* (2017.01)
  *G06T 7/00* (2017.01)

(52) U.S. Cl.
  CPC ............ *G06T 11/60* (2013.01); *G06T 7/0012* (2013.01); *G06T 7/33* (2017.01); *G06T 2207/10024* (2013.01); *G06T 2207/10072* (2013.01); *G06T 2207/10136* (2013.01); *G06T 2207/20221* (2013.01); *G06T 2207/30004* (2013.01)

(58) Field of Classification Search
  CPC .............................. G06T 11/60; G06T 7/0012
  See application file for complete search history.

(56) References Cited

U.S. PATENT DOCUMENTS

| 5,296,935 A | * | 3/1994 | Bresler | ................... | G06F 17/15 358/406 |
| 2001/0031920 A1 | * | 10/2001 | Kaufman | ................ | G06T 19/00 600/431 |
| 2001/0035871 A1 | * | 11/2001 | Bieger | ................... | A61B 5/065 345/630 |

(Continued)

FOREIGN PATENT DOCUMENTS

| JP | 2003-325510 A | 11/2003 |
| JP | 2004-113629 | 4/2004 |

(Continued)

OTHER PUBLICATIONS

Office Action dated Jul. 2, 2019 in corresponding Japanese Patent Application No. 2015-252216, 3 pages.

*Primary Examiner* — Gandhi Thirugnanam
(74) *Attorney, Agent, or Firm* — Oblon, McClelland, Maier & Neustadt, L.L.P.

(57) ABSTRACT

According to one embodiment, a medical image diagnostic apparatus includes processing circuitry. The processing circuitry acquires at least one piece of spatial analysis information obtained by analyzing medical image data of an object, the medical image data being generated by another medical image diagnostic apparatus of modality different from an own apparatus. The processing circuitry then generates a superimposed image by superimposing an image indicating the at least one piece of spatial analysis information on a first medical image of the object generated by the own apparatus, and causes a display to display the superimposed image.

2 Claims, 8 Drawing Sheets

(56) References Cited

U.S. PATENT DOCUMENTS

| | | | |
|---|---|---|---|
| 2005/0119570 A1* | 6/2005 | Lewis | A61B 8/12 600/437 |
| 2005/0203417 A1* | 9/2005 | Okuno | A61B 8/0841 600/463 |
| 2007/0010743 A1* | 1/2007 | Arai | A61B 8/13 600/443 |
| 2007/0053485 A1* | 3/2007 | Kobayashi | A61B 5/4872 378/19 |
| 2007/0100234 A1* | 5/2007 | Arenson | A61B 6/463 600/429 |
| 2007/0230758 A1* | 10/2007 | Fan | G06T 7/32 382/128 |
| 2008/0004529 A1* | 1/2008 | Kawashima | A61B 1/0051 600/443 |
| 2008/0146933 A1* | 6/2008 | Lewis | A61B 8/12 600/447 |
| 2008/0242971 A1* | 10/2008 | Klingenbeck-Regn | A61B 90/11 600/407 |
| 2009/0097723 A1* | 4/2009 | Washburn | A61B 8/06 382/128 |
| 2009/0306514 A1* | 12/2009 | Imamura | A61B 8/14 600/458 |
| 2010/0106002 A1* | 4/2010 | Sugiyama | G06T 9/20 600/410 |
| 2010/0295766 A1* | 11/2010 | Albani | G09G 3/3413 345/102 |
| 2011/0107270 A1* | 5/2011 | Wang | G16H 20/40 715/850 |
| 2011/0160566 A1* | 6/2011 | Petropoulos | A61N 5/1049 600/411 |
| 2012/0019548 A1* | 1/2012 | Zhu | G06T 15/503 345/589 |
| 2012/0179040 A1 | 7/2012 | Arai et al. | |
| 2012/0184851 A1 | 7/2012 | Arai et al. | |
| 2012/0184852 A1 | 7/2012 | Arai et al. | |
| 2013/0109970 A1* | 5/2013 | Higuchi | A61B 8/00 600/443 |
| 2013/0245447 A1 | 9/2013 | Imamura et al. | |
| 2014/0171800 A1* | 6/2014 | Kondou | A61B 8/14 600/440 |
| 2015/0178921 A1* | 6/2015 | Hashimoto | A61B 8/13 382/131 |
| 2015/0193931 A1* | 7/2015 | Fuchigami | A61B 6/4417 382/132 |
| 2015/0193932 A1* | 7/2015 | Hashimoto | A61B 6/032 382/132 |
| 2015/0193962 A1* | 7/2015 | Ohuchi | A61B 6/4417 345/427 |
| 2015/0327780 A1* | 11/2015 | Kano | A61B 5/026 600/407 |
| 2016/0110890 A1* | 4/2016 | Smith | G06T 7/0012 382/128 |
| 2017/0186200 A1* | 6/2017 | Utsunomiya | G06T 11/60 |
| 2017/0258439 A1* | 9/2017 | Jasperson | B06B 1/0688 |
| 2020/0085412 A1* | 3/2020 | Sperling | A61B 8/13 |

FOREIGN PATENT DOCUMENTS

| | | |
|---|---|---|
| JP | 2007-37781 | 2/2007 |
| JP | 2007-244575 | 9/2007 |
| JP | 2007-275588 | 10/2007 |
| JP | 2008-6108 | 1/2008 |
| JP | 2009-297072 | 12/2009 |
| JP | 2011-177494 A | 9/2011 |
| JP | 2012-40220 A | 3/2012 |
| JP | 2013-75155 | 4/2013 |
| JP | 2013-198722 A | 10/2013 |
| JP | 2014-39877 | 3/2014 |
| JP | 2015-228934 A | 12/2015 |

\* cited by examiner

MEDICAL IMAGE DIAGNOSTIC APPARATUS AND MEDICAL IMAGE DIAGNOSTIC METHOD

CROSS-REFERENCE TO RELATED APPLICATIONS

This application claims the benefit of priority of Japanese Patent Application No. 2015-252216, filed Dec. 24, 2015, the entire contents of which are incorporated herein by reference.

FIELD

Embodiments described herein relate generally to a medical image diagnostic apparatus and a medical image diagnostic method.

BACKGROUND

A medical image diagnostic apparatus configured to image an object for performing image diagnosis includes, e.g., an ultrasonic diagnostic apparatus, an MRI (Magnetic Resonance Imaging) apparatus, an X-ray CT (Computed Tomography) apparatus, and a nuclear medicine diagnostic apparatus such as a SPECT (Single Photon Emission Computed Tomography) apparatus and a PET (Positron Emission Tomography) apparatus.

Even the same organ of the same patient depicted in an ultrasonic image imaged by an ultrasonic diagnostic apparatus is different in how the organ appears in the image from a CT image and an MRI image due to a position of a probe, a direction of a probe, and a respiratory condition. Thus, a certain skill and knowledge are required for a user to understand spatial positional relationship peculiar to an ultrasonic image. Meanwhile, it is sometimes said that how to read a medical image is educated by using CT images and MRI images, and how to read a general cross-sectional image obtained in an ultrasound examination is not sufficiently educated in the recent medical education. Thus, some users utilizing medical images are unaccustomed to ultrasonic images and take much time in understanding an ultrasonic image despite being able to easily understand another type of medical image such as a CT images and an MRI image.

In many cases, a medical image generated by a medical image diagnostic apparatus and analysis information obtained by analyzing this medical image have different meaning in different modality. To be able to use such information in an easier manner is considered to be advantageous to making a precise diagnosis from the comprehensive viewpoint.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinbelow, a description will be given of a medical image diagnostic apparatus and a medical image diagnostic method according to embodiments of the present invention with reference to the drawings.

In one embodiment, a medical image diagnostic apparatus acquires information obtained by analyzing a medical image generated by a modality different from the own apparatus and superimposes an image indicative of the acquired information on a medical image generated by the own apparatus.

In general, according to one embodiment, a medical image diagnostic apparatus includes processing circuitry. The processing circuitry acquires at least one piece of spatial analysis information obtained by analyzing medical image data of an object, the medical image data being generated by another medical image diagnostic apparatus of modality different from an own apparatus. The processing circuitry then generates a superimposed image by superimposing an image indicating the at least one piece of spatial analysis information on a first medical image of the object generated by the own apparatus, and causes a display to display the superimposed image.

(Overall Configuration)

Figure 1:
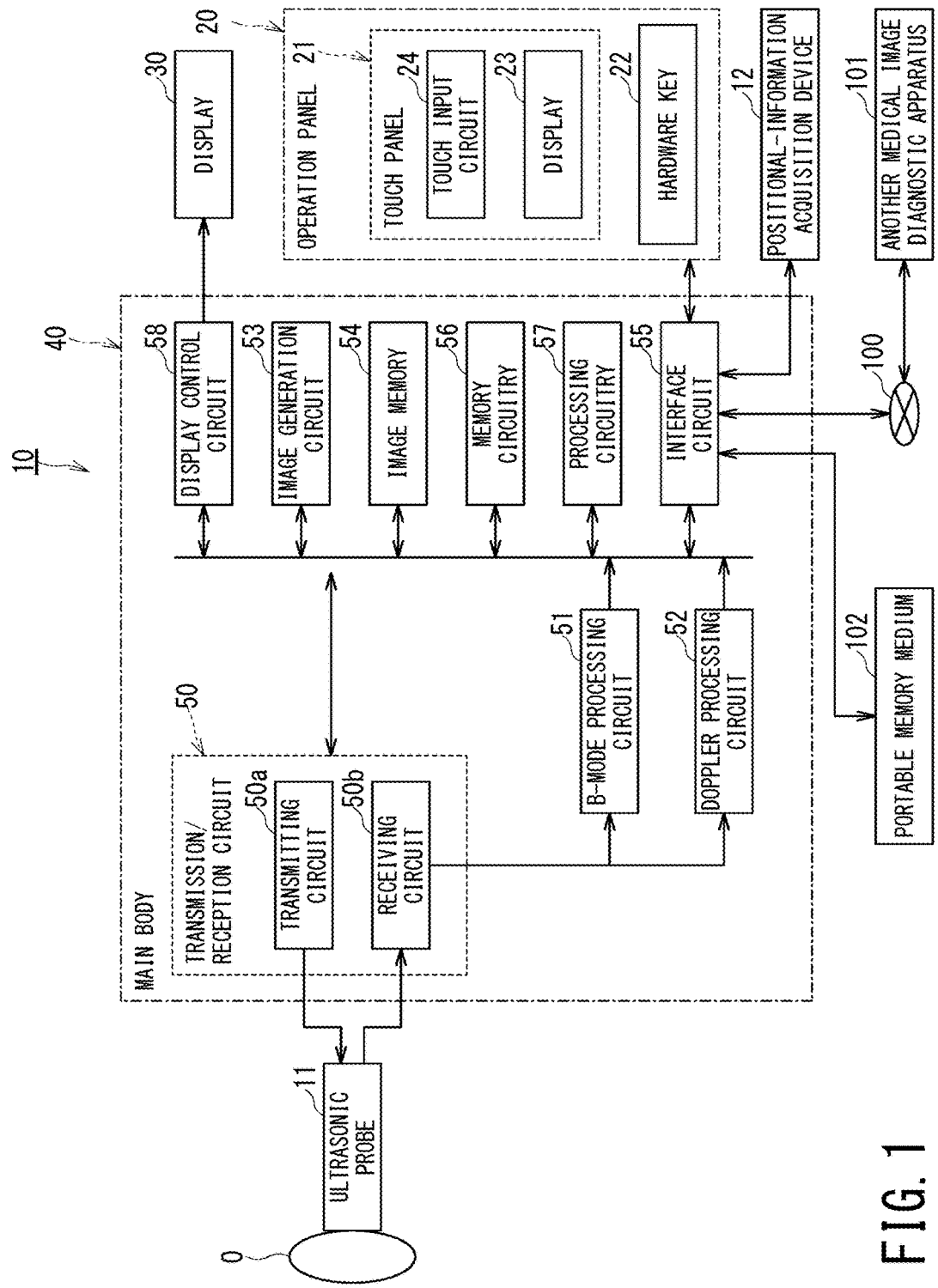
FIG. 1 is a block diagram illustrating a configuration of the ultrasonic diagnostic apparatus of the present embodiment.

FIG. 1 is a block diagram illustrating a configuration of the ultrasonic diagnostic apparatus 10 of the present embodiment. In the present embodiment, a description will be given of a case where the ultrasonic diagnostic apparatus 10 is used for a medical image diagnostic apparatus of the present invention. Additionally, a medical image diagnostic apparatus is not limited to an ultrasonic diagnostic apparatus as long as it is configured to acquire information obtained by analyzing a medical image generated by another medical image diagnostic apparatus of modality different from the own apparatus and to superimpose an image indicative of the acquired information on a medical image generated by the own apparatus. For instance, a medical image diagnostic apparatus may be an MRI apparatus, an X-ray CT apparatus, or a nuclear medicine diagnostic apparatus.

As shown in FIG. 1, the ultrasonic diagnostic apparatus 10 includes an ultrasonic probe 11, a positional-information acquisition device 12, an operation panel 20, a display 30, and a main body 40 of the apparatus.

The ultrasonic probe 11 includes plural ultrasonic transducers (i.e., piezoelectric vibrators). These ultrasonic transducers generate ultrasonic waves based on a driving signal supplied from the main body 40. The ultrasonic probe 11 transmits a beam-form ultrasonic wave (i.e., an ultrasonic beam) to inside of an object O by converging an ultrasonic wave. Further, the ultrasonic probe 11 receives an echo signal from the object O and converts the received echo signal into an electrical signal. Moreover, the ultrasonic probe 11 includes a matching layer provided on the piezoelectric vibrators and a backing material which prevents ultrasonic waves from propagating toward the back side of the piezoelectric vibrators.

When an ultrasonic beam is transmitted from the ultrasonic probe 11 to the object O, the transmitted ultrasonic beam is subsequently reflected on each discontinuous plane of acoustic impedance in body tissues of the object O and the reflected waves are received as an echo signal by the plural ultrasonic transducers. Amplitude of an echo signal to be received is dependent on difference in acoustic impedance at a discontinuous plane where an ultrasonic beam is reflected. When a transmitted ultrasonic pulse is reflected on flowing blood or a cardiac wall, the reflected wave signal is subjected to frequency shift due to the Doppler effect depending on a blood flow velocity component with respect to the ultrasonic-wave transmission direction.

The present embodiment is applicable to a case of three-dimensionally scanning the object O by using the ultrasonic probe 11 in which plural piezoelectric vibrators are two-dimensionally arranged in the form of a matrix. The present embodiment is also applicable to a case of two-dimensionally scanning the object O by using the ultrasonic probe 11 configured as a one-dimensional probe by one-dimensionally arranging plural piezoelectric vibrators in one line or a case of three-dimensionally scanning the object O by rotating the plural piezoelectric vibrators in such a one-dimensional ultrasonic probe 11. The present embodiment is further applicable to a case of the ultrasonic probe 11 configured as a one-dimensional ultrasonic probe in which plural piezoelectric vibrators are mechanically swung. Hereinafter, a description will be given of a case where the ultrasonic probe 11 is a two-dimensional ultrasonic probe equipped with plural (e.g., 48×50) piezoelectric vibrators two-dimensionally arranged like a matrix.

The ultrasonic probe 11 acquires freely-selected cross-sectional image data of the object O and a three-dimensional ultrasonic image data.

The positional-information acquisition device 12 acquires positional information of the ultrasonic probe 11. The positional-information acquisition device 12 can be configured of components such as a magnetic sensor, an infrared ray sensor, an optical sensor, or an acceleration sensor. When a marker is provided on the case of the ultrasonic probe 11, the positional-information acquisition device 12 may determine positional information of the ultrasonic probe 11 based on images obtained by imaging this marker from plural directions with the use of plural cameras. In this case, the distance between the marker and the arrangement plane of the ultrasonic transducers or the distance between the marker and a predetermined position of the case of the ultrasonic probe 11 may be desirably stored as offset information in the memory circuitry 56 in advance.

The operation panel 20 includes a touch panel 21 and a hardware key 22. The touch panel 21 functions as a touch command screen, and includes a display 23 and a touch input circuit 24 disposed beside the display 23. The display 23 of the touch panel 21 is configured of a general display output device such as a liquid crystal display, an OLED (Organic Light Emitting Diode). The touch input circuit 24 provides the main body 40 with information of an indicated position on a touch input circuit touched by a user. The hardware key 22 is, for instance, a keyboard, a mouse, a foot switch, a track ball, and/or various types of buttons.

The touch input circuit 24 and the hardware key 22 of the touch panel 21 constitute an input circuit, receive various types of commands from a user of the ultrasonic diagnostic apparatus 10, and transfer the received commands to the main body 40 via the interface circuit 55. Specifically, the touch input circuit 24 and the hardware key 22 receive a command from a user such as a command to start alignment (i.e., positioning) and a command to determine alignment, and output an operational input signal in accordance with a user's operation to the main body 40.

The display 30 is configured of a general display output device such as a liquid crystal display and an OLED, and displays an ultrasonic image generated by the main body 40. Additionally, the display 30 displays, for instance, an image for a user of the ultrasonic diagnostic apparatus 10 to input various types of commands.

The main body 40 generates an ultrasonic image based on an echo signal from the object O received by the ultrasonic probe 11. The main body 40 can generate two-dimensional ultrasonic image based on a two-dimensional echo signal, and can generate a three-dimensional ultrasonic image based on a three-dimensional echo signal.

As shown in FIG. 1, the main body 40 includes a transmission/reception circuit 50, a B-mode processing circuit 51, a Doppler processing circuit 52, an image generation circuit 53, an image memory 54, an interface circuit 55, memory circuitry 56, processing circuitry 57, and a display control circuit 58.

The transmission/reception circuit 50 includes a transmitting circuit 50a and a receiving circuit 50b, and controls transmission directivity and reception directivity in transmission and reception of ultrasonic waves, respectively.

The transmitting circuit 50a includes a pulse generator, a transmission delay circuit, and a pulsar circuit, and supplies the ultrasonic probe 11 with a driving signal. The pulse generator repeatedly generates a rate pulse for forming an ultrasonic wave to be transmitted at a predetermined rate frequency. The transmission delay circuit provides each rate pulse generated by the pulse generator with a delay time for each piezoelectric vibrator. This delay time is necessary for converging an ultrasonic wave generated by the ultrasonic probe 11 into an ultrasonic beam and determining transmission directivity. Additionally, the pulsar circuit applies a driving pulse to the ultrasonic probe 11 at a timing based on each rate pulse. The transmission delay circuit appropriately adjusts a transmission direction of an ultrasonic beam transmitted from the piezoelectric vibrators plane by changing the delay time provided to each rate pulse.

Additionally, in order to execute a predetermined pulse sequence under the control of the processing circuitry 57, the transmitting circuit 50a has a function of instantaneously changing parameters such as a transmission frequency and a transmission driving voltage. The function of changing a transmission driving voltage is implemented by a linear amplifier type of oscillator capable of instantaneously changing the value of the transmission driving voltage or a structure of electrically switching plural power-supply units.

The receiving circuit 50b includes circuit elements such as an amplifier circuit, an A/D converter, and an adder circuit. The receiving circuit 50b receives echo signals received by the ultrasonic probe 11 and generates reflected wave data by performing various types of processing on the echo signals. The amplifier circuit performs gain correction processing by amplifying echo signals for each channel. The A/D converter performs A/D conversion on the reflected wave signals subjected to the gain correction processing, and provides the digitized data with a delay time necessary for determining reception directivity. The adder circuit performs addition processing of the echo signals digitized by the A/D converter so as to generate reflected wave data. Each reflected component from a direction according to reception directivity of each echo signal is enhanced by the addition processing of the adder circuit.

In the present embodiment, a description will be given of a case where the ultrasonic probe 11 is configured to be able to perform a three-dimensional scan. In this case, the transmitting circuit 50a can cause the ultrasonic probe 11 to transmit a three-dimensional ultrasonic beam to the object O. Additionally, the receiving circuit 50b can generate three-dimensional reflected wave data from three-dimensional reflected wave signals received by the ultrasonic probe 11.

The B-mode processing circuit 51 receives reflected wave data from the receiving circuit 50b and performs predetermined processing such as logarithmic amplification and envelope detection on the reflected wave data so as to generate B-mode data in which signal intensity is indicated by brightness.

The Doppler processing circuit 52 performs frequency analysis on velocity information included in the reflected wave data received from the receiving circuit 50b, and extracts a blood-flow component, a tissue component, and a contrast-agent echo component by the Doppler effect. In this manner, the Doppler processing circuit 52 generates Doppler data in which moving-object information items such as the average velocity, variance, and power are extracted for multiple points.

The B-mode processing circuit 51 and the Doppler processing circuit 52 of the present embodiment can process both of two-dimensional reflected wave data and three-dimensional reflected wave data. In other words, the B-mode processing circuit 51 can generate two-dimensional B-mode data from two-dimensional reflected wave data and can generate three-dimensional B-mode data from three-dimensional reflected wave data. Similarly, the Doppler processing circuit 52 can generate two-dimensional Doppler data from two-dimensional reflected wave data and can generate three-dimensional Doppler data from three-dimensional reflected wave data.

The image generation circuit 53 generates an ultrasonic image based on each reflected wave received by the ultrasonic probe 11. In other words, the image generation circuit 53 generates an ultrasonic image from data generated by the B-mode processing circuit 51 and the Doppler processing circuit 52. For instance, the image generation circuit 53 generates a two-dimensional B-mode image in which intensity of a reflected wave is indicated by brightness, from two-dimensional B-mode data generated by the B-mode processing circuit 51. Additionally, the image generation circuit 53 generates a two-dimensional color Doppler image indicative of moving-object information from two-dimensional Doppler data generated by the Doppler processing circuit 52. Such a two-dimensional color Doppler image is generated as an average velocity image, a variance image, a power image, or a combination image of these images. In the following description of the present embodiment, a two-dimensional ultrasonic image such as a two-dimensional B-mode image and a two-dimensional color Doppler image is arbitrarily referred to as the first medical image.

In general, the image generation circuit 53 converts (i.e. executes scan converting on) signal lines of respective ultrasonic scanlines into scanning signal lines of a video format typified by a television format so as to generate a two-dimensional ultrasonic image as a display image. Specifically, the image generation circuit 53 generates a two-dimensional ultrasonic image for display by performing coordinate conversion according to an ultrasonic scan aspect of the ultrasonic probe 11.

Additionally, the image generation circuit 53 may generate a two-dimensional B-mode image of an arbitrary cross-section based on three-dimensional B-mode data generated by the B-mode processing circuit 51. Further, the image generation circuit 53 may generate a two-dimensional color Doppler image based on three-dimensional Doppler data generated by the Doppler processing circuit 52. In the following description of the present embodiment, three-dimensional ultrasonic image data such as three-dimensional B-mode data and three-dimensional color Doppler data are arbitrarily referred to as the first volume data. The first volume data are stored in, e.g., the memory circuitry 56.

Moreover, the image generation circuit 53 generates the first medical image (i.e., a two-dimensional ultrasonic image) based on the first volume data and stores the first medical image in the image memory 54, under the control of the processing circuitry 57.

The image memory 54 is a memory circuit configured to store data of two-dimensional ultrasonic images generated by the image generation circuit 53. For instance, the image memory 54 may store two-dimensional ultrasonic images generated by the B-mode processing circuit 51 and/or the Doppler processing circuit 52.

The interface circuit 55 is an interface controlling transmission and reception of data between the processing circuitry 57 and other components such as the positional-information acquisition device 12, a network 100, and a portable memory medium 102 like an optical disc. For instance, the positional-information acquisition device 12 acquires positional information of the ultrasonic probe 11, and provides this positional information to the processing circuitry 57 via the interface circuit 55.

The memory circuitry 56 is equipped with a configuration including memory media which can be read by a processor such as a magnetic memory medium, an optical memory medium, and a semiconductor memory. The memory circuitry 56 may be configured so that some or all of the programs and data stored in those memory media can be downloaded by means of communication via an electronic network.

Additionally, the memory circuitry 56 stores three-dimensional ultrasonic image data such as three-dimensional B-mode data and three-dimensional color Doppler data. Further, the memory circuitry 56 stores at least analysis information obtained by analyzing volume data which are generated by another medical image diagnostic apparatus 101 of modality different from the ultrasonic diagnostic apparatus 10. In this case, plural types of analysis information may be acquired and stored in the memory circuitry 56.

When the medical image diagnostic apparatus is the ultrasonic diagnostic apparatus 10, another medical image diagnostic apparatus 101 is, e.g., an MRI apparatus, an X-ray CT apparatus, or a nuclear medicine diagnostic apparatus. Additionally, analysis information is information obtained by analyzing an MRI image, a CT image, or a nuclear medicine diagnostic image. The analysis information is desirably spatial analysis information which assists a user in understanding spatial positional relationship of observation targets such as organs depicted in a medical image. Hereinafter, volume data generated by another medical image diagnostic apparatus 101 are arbitrarily referred to as the second volume data.

Moreover, the memory circuitry 56 may store volume data generated by another medical image diagnostic apparatus 101. In this case, the image generation circuit 53 may generate a two-dimensional medical image of an arbitrary cross-section based on the second volume data. Hereinafter, a two-dimensional medical image generated on the basis of the second volume data is arbitrarily referred to as the second medical image. For instance, the second medical image may be displayed as a reference image in parallel with the first medical image on the display 30.

When another medical image diagnostic apparatus 101 is an X-ray CT apparatus, the image generation circuit 53 generates, e.g., a two-dimensional CT image of the same cross-section as the two-dimensional ultrasonic image based on the second volume data and stores the generated two-dimensional CT image in the image memory 54, under the control of the processing circuitry 57.

Analysis information and the second volume data may be acquired from another medical image diagnostic apparatus 101 via the network 100 and the interface circuit 55 or may be acquired from the portable memory medium 102 via the interface circuit 55. Additionally, analysis information and the second volume data may be accumulated in a non-illustrated image server on the network 100 after being generated in another medical image diagnostic apparatus 101, for instance. In this case, the analysis information and the second volume data may be acquired from the image server via the network 100 and the interface circuit 55.

The processing circuitry 57 is a processor configured to execute processing which assists a user in easily understanding the first medical image. Specifically, the processing circuitry 57 generates a superimposed image by superimposing information obtained by analyzing medical image data generated by another medical image diagnostic apparatus 101 on the first medical image. Note that the processing circuitry 57 executes the above-described processing by reading out and executing necessary programs stored in the memory circuitry 56 and another medical image diagnostic apparatus 101 is an apparatus different in modality from the own apparatus. Further, the processing circuitry 57 causes the display 30 to display the superimposed image generated in above manner.

In the present embodiment, a description will be given of a case where the own apparatus is the ultrasonic diagnostic apparatus 10. In this case, the processing circuitry 57 assists a user in easily understanding a two-dimensional ultrasonic image in the above-described manner. That is, the processing circuitry 57 generates a superimposed image by superimposing information obtained from analysis of medical image data generated by another medical image diagnostic apparatus 101 on a two-dimensional ultrasonic image generated by the own apparatus, and displays the superimposed image on the display 30.

Additionally, the processing circuitry 57 controls the entire processing of the ultrasonic diagnostic apparatus 10.

The display control circuit 58 includes components such as a GPU (Graphics Processing Unit) and a VRAM (Video Random Access Memory). The display control circuit 58 divides the display area of the display 30 as needed and displays an image which is requested to be displayed on the display 30 by the processing circuitry 57, under the control of the processing circuitry 57.

The display control circuit 58 may display an image, which is substantially equivalent to the image displayed on the display 30, on the display 23 of the operation panel 20.

(Functions of Processing Circuitry 57)

Figure 2:
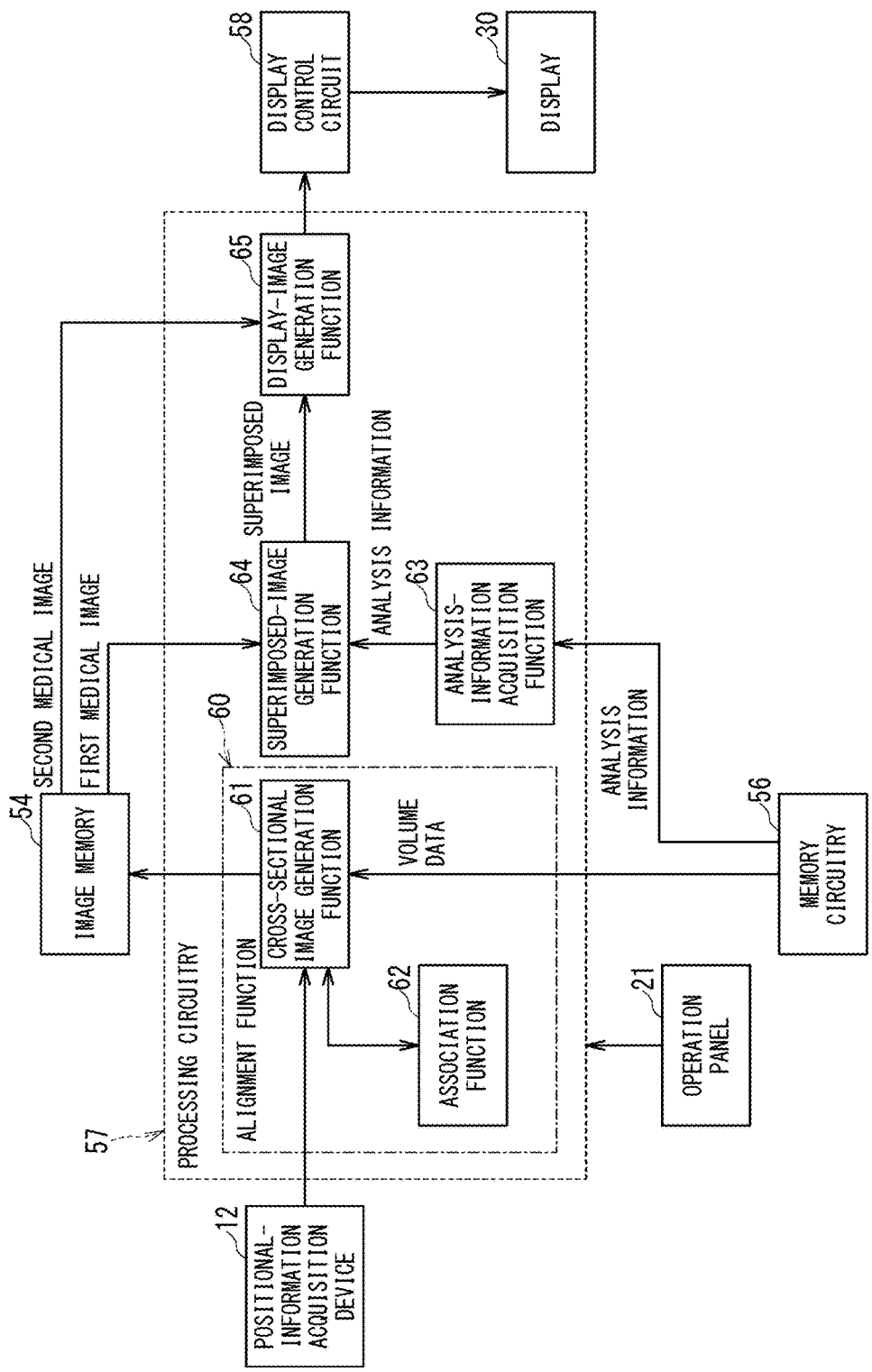
FIG. 2 is a block diagram illustrating functions implemented by a processor of processing circuitry.

FIG. 2 is a block diagram illustrating functions implemented by the processor of the processing circuitry 57. As shown in FIG. 2, the processor of the processing circuitry 57 implements an alignment function 60. The alignment function 60 includes a cross-sectional image generation function 61 and an association function 62. Additionally, the processor of the processing circuitry 57 implements an analysis-information acquisition function 63, a superimposed-image generation function 64, and a display-image generation function 65. These functions 60 to 65 are stored in the form of programs in the memory circuitry 56.

(Alignment)

It is preferable that the ultrasonic diagnostic apparatus 10 aligns (performs positioning of) the second volume data and each two-dimensional ultrasonic image acquired in real time so as to extract a cross-sectional image from the second volume data having the same cross-section as every two-dimensional ultrasonic image subsequently acquired in real time. First, alignment of a two-dimensional ultrasonic image and the second volume data will be described as one case of the first medical image.

The positional-information acquisition device 12 includes, e.g., a transmitter, a magnetic sensor, and a control device, and is connected to the processing circuitry 57 via the interface circuit 55.

The transmitter transmits a reference signal. Specifically, the transmitter is disposed at a freely-selected position, and forms a magnetic field from the transmitter.

The magnetic sensor acquires positional information in three-dimensional space by receiving the reference signal. Specifically, the magnetic sensor is mounted on the surface of the ultrasonic probe 11, detects a three-dimensional magnetic field formed by the transmitter, converts the detected magnetic field information into an electric signal of a predetermined form, and outputs the converted signal to the control device.

The control device calculates the coordinates and orientation of the magnetic sensor in the three-dimensional coordinates whose origin is the transmitter, based on the signal received from the magnetic sensor. Then, the control device outputs the calculated coordinates and orientation of the magnetic sensor as positional information of the ultrasonic probe 11 to the processing circuitry 57. It is preferable that the object O is positioned within a range in which the magnetic sensor mounted on the ultrasonic probe 11 can accurately detect a magnetic field outputted by the transmitter.

The alignment function 60 acquires positional information of the ultrasonic probe 11 from the positional-information acquisition device 12, and aligns the second volume data generated by another medical image diagnostic apparatus 101 and a two-dimensional ultrasonic image generated as an example of the first medical image by the own apparatus.

First, the alignment function 60 receives a user's command to start alignment from an input circuit configured of the touch input circuit 24 and the hardware key 22 of the touch panel 21. When the alignment function 60 receives the command to start alignment, the alignment function 60 starts a default alignment processing. In the default alignment processing, the alignment function 60 associates the three-dimensional coordinates whose origin is the transmitter with the three-dimensional coordinates of the second volume data generated by another medical image diagnostic apparatus 101.

Specifically, the cross-sectional image generation function 61 acquires positional information of the ultrasonic probe 11 from the positional-information acquisition device 12. Then, the three-dimensional ultrasonic image data (i.e., the first image data) of the object O, which are constructed by the image generation circuit 53 from plural two-dimensional ultrasonic data acquired by the ultrasonic probe 11 or are directly imaged by the ultrasonic probe 11, are stored in the memory circuitry 56 after being associated with the three-dimensional coordinates whose origin is the transmitter.

The cross-sectional image generation function 61 generates the first medical image of an arbitrary cross-section based on the three-dimensional ultrasonic data in the default alignment processing. The first medical image of an arbitrary cross-section is a cross-sectional image of a predetermined cross-section such as each of three cross-sectional images perpendicular to each other. The first medical images generated in the default alignment processing are stored in the image memory 54, and displayed on the display 30 under the control of the display control circuit 58. A user can move and rotate a cross-section of each of the first medical images via the input circuit, while observing the first medical images displayed on the display 30. The cross-sectional image generation function 61 changes the first medical image so that the changed first medical image follows a cross-section being changed by a user's operation, and causes the display 30 to display the changed first medical image.

When a user selects the second volume data used as a source of analysis information which the user desires to refer to, the cross-sectional image generation function 61 generates a second medical image of an arbitrary cross-section based on the selected second volume data and stores the generated second medical image in the image memory 54. It is preferable that the second volume data and analysis information are preliminarily stored in the memory circuitry in advance of start of the default alignment processing.

Each of the second medical images of arbitrary cross-sections is a cross-sectional image of a predetermined cross-section such as each of three cross-sectional images perpendicular to each other. The second medical images are also stored in the image memory 54 and displayed on the display 30 under the control of the display control circuit 58 in a manner similar to the first medical images. Additionally, a user can move and rotate a cross-section of each of the second medical images via the input circuit, while observing the second medical images displayed on the display 30. The cross-sectional image generation function 61 changes the second medical image so that the changed second medical image follows a cross-section being changed by a user's operation, and causes the display 30 to display the changed second medical image.

In other words, for instance, three cross-sectional images which are perpendicular to each other and generated from three-dimensional ultrasonic data are displayed on the display 30 together with three cross-sectional images which are perpendicular to each other and generated from the second volume data. Cross-sectional matching between the target first medical image and the target second medical image corresponding to each other can be confirmed by changing the cross-sectional orientation of the target first medical image or the target second medical image.

When a user confirms cross-sectional matching between each of the first medical images and each of the second medical images by observing the display 30, the user inputs a command to determine alignment via the input circuit.

When the association function 62 receives the command to determine alignment, the association function 62 uniquely associates the three-dimensional coordinates of the first volume data with the three-dimensional coordinates of the second volume data based on the information on the first and second medical images at the timing of receiving the command to determine alignment and thereby the default alignment processing is completed. Note that the above three-dimensional coordinates of the first volume data are the three-dimensional coordinates of three-dimensional ultrasonic data whose origin is the transmitter.

After completion of the default alignment processing, the cross-sectional image generation function 61 can accurately extract the second medical image of the same cross-section as the first medical image from the second volume data based on the positional information provided from the positional-information acquisition device 12. For instance, each time the first medical image is acquired in real time by attaching the ultrasonic probe 11 to an arbitrary position of the object O, the cross-sectional image generation function 61 accurately extracts the second medical image of the same cross-section as the newly acquired first medical image in the above manner.

(Generation Operation of Superimposed Image)

Next, a superimposed image obtained by superimposing analysis information of medical image data generated in another medical image diagnostic apparatus 101 on the two-dimensional ultrasonic image will be described. Such a superimposed image is generated in order for a user to easily understand a two-dimensional ultrasonic image.

Figure 3:
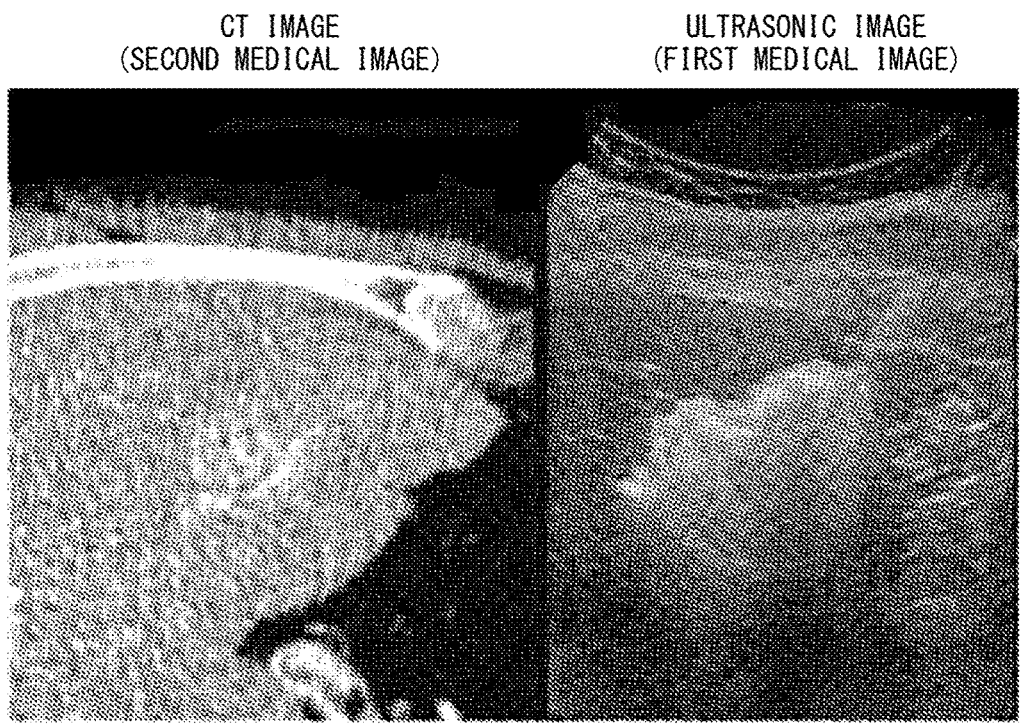
FIG. 3 is a schematic diagram illustrating a conventional parallel image in which an ultrasonic image as the first medical image and a CT image as the second medical image are displayed in parallel.

FIG. 3 is a schematic diagram illustrating a conventional parallel image in which an ultrasonic image as the first medical image and a CT image as the second medical image are displayed in parallel.

As shown in FIG. 3, so-called fusion display is conventionally performed. In the conventional fusion display, a two-dimensional ultrasonic image and an image generated by a modality different from an ultrasonic diagnostic apparatus are displayed in parallel.

As compared with a CT image and an MRI image, an ultrasonic image is characterized in that both time resolution and spatial resolution are high. However, an ultrasonic image tends to be inferior to a CT image and an MRI image in terms of boundary visibility of a structure such as a tumor and an organ. Additionally, an ultrasonic image has a theoretical limitation in that artifact is generated and an observation target cannot be clearly depicted when gas and/or a bone exists between a probe and an observation target. Thus, for instance, to display an ultrasonic image in parallel with another type of medical image such as a CT image and/or analysis result assists understanding of the ultrasonic image.

For this reason, the processing circuitry 57 of the ultrasonic diagnostic apparatus 10 of the present embodiment assists a user in easily understanding a two-dimensional ultrasonic image, by causing the display 30 to display a superimposed image obtained by superimposing analysis information of medical image data generated in another medical image diagnostic apparatus 101 on a two-dimensional ultrasonic image.

Specifically, the analysis-information acquisition function 63 acquires, e.g., at least one piece of analysis information obtained by analyzing medical image data of the object O which are generated by another medical image diagnostic apparatus 101 different in modality from the own apparatus, from the memory circuitry 56.

The superimposed-image generation function 64 generates a superimposed image by superimposing an image indicative of at least one piece of analysis information on a two-dimensional ultrasonic image of the object O generated as the first medical image by the own apparatus, for instance. The superimposed-image generation function 64 provides the generated superimposed image to the display-image generation function 65. The display-image generation function 65 may be omitted from the ultrasonic diagnostic apparatus 10. When the ultrasonic diagnostic apparatus 10 is not equipped with the display-image generation function 65, the superimposed-image generation function 64 causes the display 30 to display the generated superimposed image via the display control circuit 58.

The display-image generation function 65 generates a parallel image in which the first medical image and the second medical image based on medical image data generated by another medical image diagnostic apparatus 101 are arranged in parallel, for instance. The display-image generation function 65 causes the display 30 to display the generated parallel image via the display control circuit 58.

Figure 4:
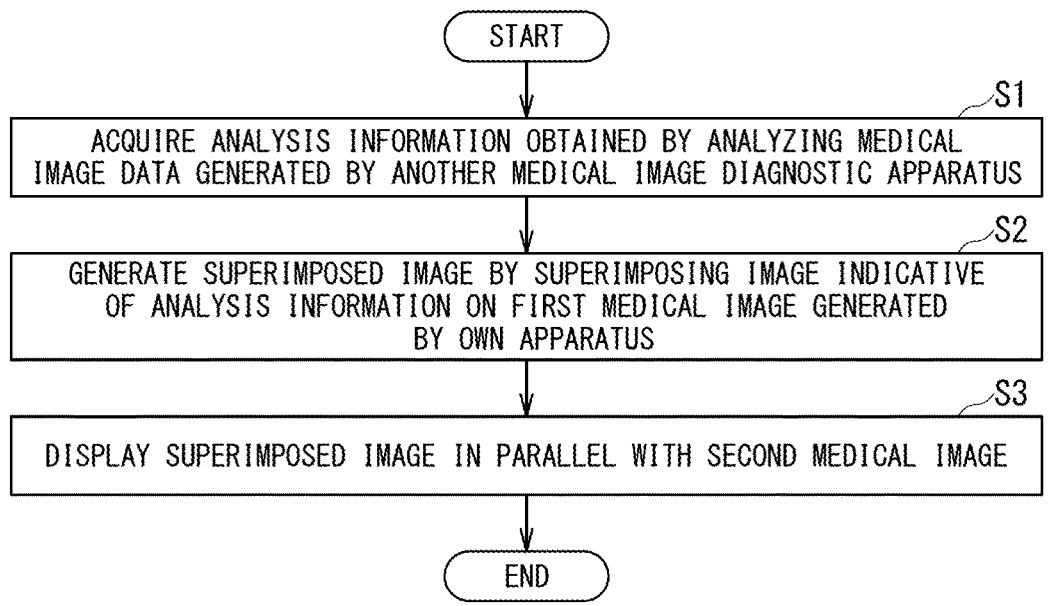
FIG. 4 is a flowchart illustrating overall processing in which the processor of the processing circuitry generates a superimposed image by superimposing analysis information obtained from medical image data generated in another modality different from the own apparatus on the first medical image generated by the own apparatus and causes a display to display the superimposed image.

FIG. 4 is a flowchart illustrating overall processing in which the processor of the processing circuitry 57 generates a superimposed image and causes the display 30 to display the superimposed image. In the case of FIG. 4, a superimposed image is generated by superimposing analysis information of medical image data generated in another medical image diagnostic apparatus 101 different in modality from the own apparatus on the first medical image generated by the own apparatus. In FIG. 4, each reference sign consisting of S and number on its right side indicates each step of the flowchart. The processing shown in FIG. 4 starts after the second medical image data (second volume data) as a source of analysis information which a user desires to refer to and this analysis information are stored in the memory circuitry 56 in advance.

First, in the step S1, the analysis-information acquisition function 63 acquires at least one piece of analysis information obtained by analyzing medical image data generated in another medical image diagnostic apparatus 101, from the memory circuitry 56. For instance, when the own apparatus is the ultrasonic diagnostic apparatus 10 and another medical image diagnostic apparatus 101 is an X-ray CT apparatus, the analysis-information acquisition function 63 acquires at least one piece of analysis information obtained by analyzing CT volume data.

As to the above-described medical image data, plural types of analysis information may be derived by performing plural types of analysis. In this case, plural types of analysis information are stored in the memory circuitry 56 in advance and are acquired by the analysis-information acquisition function 63.

Next, in the step S2, the superimposed-image generation function 64 generates a superimposed image in which an image indicative of the analysis information acquired in the step S1 is superimposed on the first medical image generated by the own apparatus. For instance, when the own apparatus is the ultrasonic diagnostic apparatus 10 and another medical image diagnostic apparatus 101 is an X-ray CT apparatus, the superimposed-image generation function 64 generates a superimposed image by superimposing an image indicative of the analysis information on a two-dimensional ultrasonic image.

Additionally, when plural types of analysis information are acquired, the superimposed-image generation function 64 may generate a superimposed image by superimposing an image indicative of the plural types of analysis information on the first medical image. In this case, a user can refer to more information and can understand the first medical image more easily.

Further, when the three-dimensional coordinates of the first volume data and the three-dimensional coordinates of the second volume data are associated with each other by the alignment function 60, the cross-sectional image generation function 61 acts as follows. That is, each time the first medical image is newly acquired in real time, the cross-sectional image generation function 61 extracts the second medical image corresponding to the position of the newly acquired first medical image (i.e., the current or updated first medical image) from the second volume data. Additionally, each time the first medical image is newly acquired, the superimposed-image generation function 64 generates a superimposed image by superimposing an image indicative of the analysis information corresponding to the second medical image extracted by the cross-sectional image generation function 61 on the first medical image.

Next, in the step S3, the display-image generation function 65 generates a parallel image in which the superimposed image generated in the step S2 and the second medical image are arranged in parallel, and causes the display 30 to display this parallel image. When the own apparatus is the ultrasonic diagnostic apparatus 10 and another medical image diagnostic apparatus 101 is an X-ray CT apparatus, the display-image generation function 65 generates a parallel image in which the superimposed image and a CT cross-sectional image are arranged in parallel and causes the display 30 to display this parallel image.

In the above manner, a superimposed image in which information obtained by analyzing medical image data generated in another medical image diagnostic apparatus 101 different in modality from the own apparatus is superimposed on the first medical image is generated and displayed on the display 30. Consequently, the ultrasonic diagnostic apparatus 10 can assist a user in easily understanding the first medical image.

Next, a superimposed image generated in the step S2 and a parallel image generated the step S3 in FIG. 4 will be described in detail with reference to FIG. 5 to FIG. 8. FIG. 5 to FIG. 8 correspond to a case where the own apparatus is the ultrasonic diagnostic apparatus 10 and another medical image diagnostic apparatus 101 is an X-ray CT apparatus.

Figure 5:
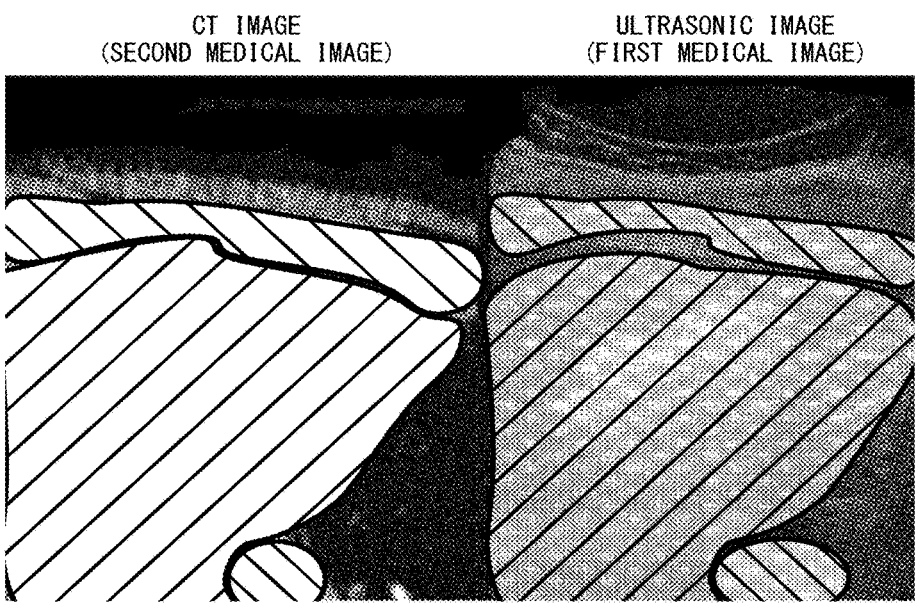
FIG. 5 is a schematic diagram illustrating a superimposed image and a parallel image when the same color is assigned to the same organ between the first medical image and the second medical image.

FIG. 5 is a schematic diagram illustrating a superimposed image and a parallel image when the same color is assigned to the same organ between the first medical image and the second medical image.

Another medical image diagnostic apparatus 101 can extract each organ from volume data generated therein and generate organ color information in which each voxel of the volume data is associated with the color of the organ to which this voxel belongs such that the colors different from each other are assigned to respective organs. In this case, analysis information acquired by the analysis-information acquisition function 63 includes the organ color information.

Also in this case, it is preferable that the superimposed-image generation function 64 generates a superimposed image based on the organ color information in the following manner so as to cause the display 30 to display the generated superimposed image (see the image on the right side of FIG. 5). That is, an image for coloring at least one organ depicted in the first medical image generated by the own apparatus is prepared so that respective organs in this first medical image can be distinguished from each other by difference in color, and then the superimposed image is generated by superimposing the prepared image on this first medical image. By superimposing an image for assigning different colors to respective organs on an ultrasonic image, time for a user to understand an ultrasonic image can be shortened.

Additionally, the superimposed-image generation function 64 preferably generates the above-described image for coloring (i.e., the image for coloring at least one organ depicted in the first medical image generated by the own apparatus) so that the transparence degree of this image for coloring is lower than a predetermined transparence degree. This is so that visibility of the original first medical image in the superimposed image is sufficiently maintained (see the image on the right side of FIG. 5). By lowering the transparence degree in coloring of the image to be superimposed on a two-dimensional ultrasonic image, time for a user to understand an ultrasonic image can be more shortened.

Also in this case, the superimposed-image generation function 64 can generate the superimposed image by superimposing the image for coloring the same color as the organ color information on the first medical image so that a color common to the first and second medical images is assigned to each organ depicted in these two images. FIG. 5 illustrates a case where a two-dimensional ultrasonic image generated in real time and a CT image of the same cross-section as this two-dimensional ultrasonic image are displayed in parallel and a color common to these two images is assigned to each organ depicted in these two images. In this case, a user can easily and precisely understand spatial positional relationship peculiar to an ultrasonic image. Thus, time for a user to understand an ultrasonic image can be further shortened.

Figure 6:
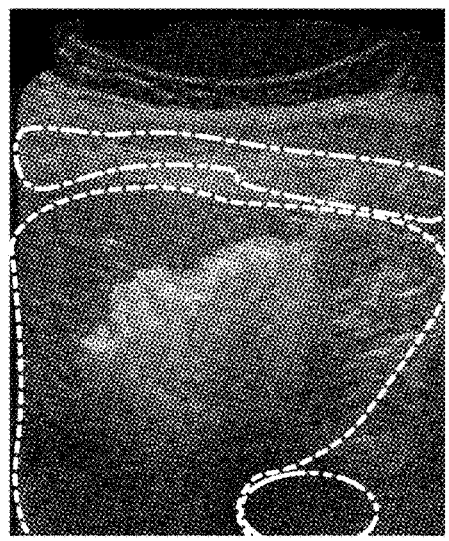
FIG. 6 illustrates a schematic superimposed image obtained by superimposing outlines of respective organs on the first medical image.

FIG. 6 illustrates a schematic superimposed image obtained by superimposing outlines of respective organs on the first medical image. Also in the case of FIG. 6, the first medical image and the second medical image may be displayed in parallel in a manner similar to the case of FIG. 5.

The superimposed-image generation function 64 may color regions of respective organs based on the organ color information as shown in FIG. 5 so that a transparence degree of each organ region becomes equal to or lower than a predetermined transparence degree. Additionally, the superimposed-image generation function 64 may generate a superimposed image by superimposing outlines of respective organs on the first medical image as shown in FIG. 6.

Time for a user to understand an ultrasonic image can be shortened also by superimposing an outline of each organ on a two-dimensional ultrasonic image. In this case, time for a user to understand a two-dimensional ultrasonic image can be further shortened if outlines of respective organs are different in display aspect from each other. Additionally, a superimposed image may be generated by superimposing both of the image for coloring respective organs as shown in FIG. 5 and outlines of respective organs as shown in FIG. 6 on the first medical image.

Moreover, when information on a tumor region is included in analysis information, the tumor region in the first medical image may be colored with a transparence degree equal to or lower than a predetermined transparence degree or the outline of the tumor region may be superimposed on the first medical image.

Figure 7:
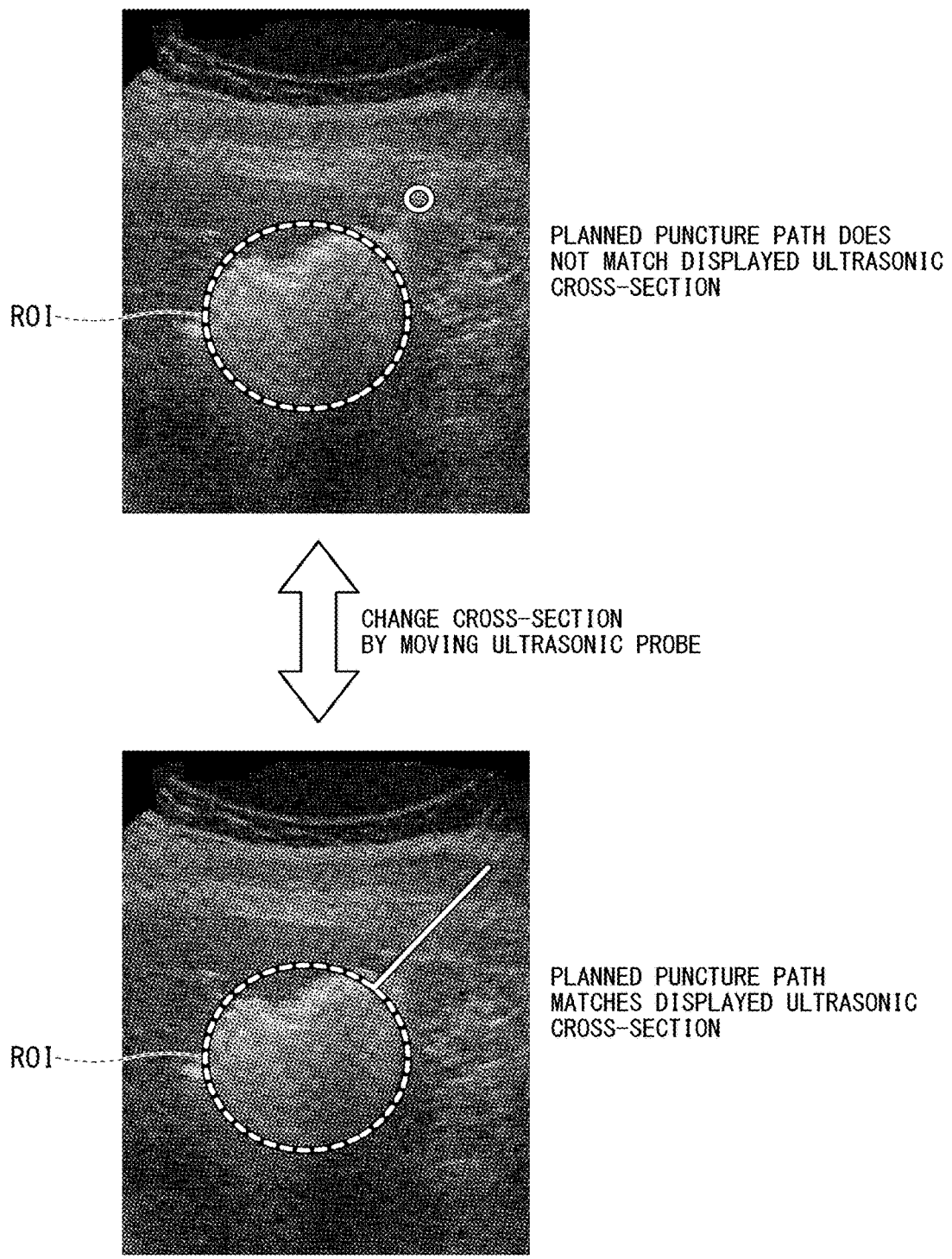
FIG. 7 is a schematic diagram illustrating superimposed images obtained by superimposing an image indicative of a position of a planned puncture path of a puncture needle on the first medical image.

FIG. 7 is a schematic diagram illustrating superimposed images obtained by superimposing an image indicative of a position of a planned puncture path of a puncture needle on the first medical image. Also in the case of FIG. 7, the first medical image and the second medical image may be displayed in parallel in a manner similar to the case of FIG. 5.

When positional information on a planned puncture path of a puncture needle is included in analysis information, the superimposed-image generation function 64 may generate a superimposed image by superimposing an image indicative of s position of a planned puncture path on a two-dimensional ultrasonic image based on two information items as follows. That is, such a superimposed image may be generated based on (a) positional information on a planned puncture path of a puncture needle with respect to a target region to be subjected to medical treatment such as a tumor region and (b) the positional information on the cross-section of the current two-dimensional ultrasonic image to be time-sequentially acquired in real time.

In this case, when the planned puncture path is at least partially positioned within the cross-section of the currently displayed two-dimensional ultrasonic image and is indicated in this cross-section almost as a whole, an image indicating the planned puncture path by a straight line is preferably superimposed on the currently displayed two-dimensional ultrasonic image as an image of indicating the position of the planned puncture path (see the image on the lower side of FIG. 7).

Contrastively, when the planned puncture path does not match the cross-section of the currently displayed two-dimensional ultrasonic image, an image indicative of the intersection point between the planned puncture path and the two-dimensional ultrasonic image is preferably superimposed on the two-dimensional ultrasonic image (see the small circular mark on the image at the upper side of FIG. 7).

Additionally, as shown by a circular broken line in FIG. 7, an image indicative of the ROI (Region Of Interest) to be cauterized by the puncture needle may be further superimposed on each of the first medical image and the second medical image.

As described above, a display aspect of an image indicative of a position of a puncture needle is changed depending on whether a planned puncture path matches the currently displayed two-dimensional ultrasonic image or not. As the result, a user can easily find the two-dimensional ultrasonic image which matches the planned puncture path while moving the ultrasonic probe 11.

Figure 8:
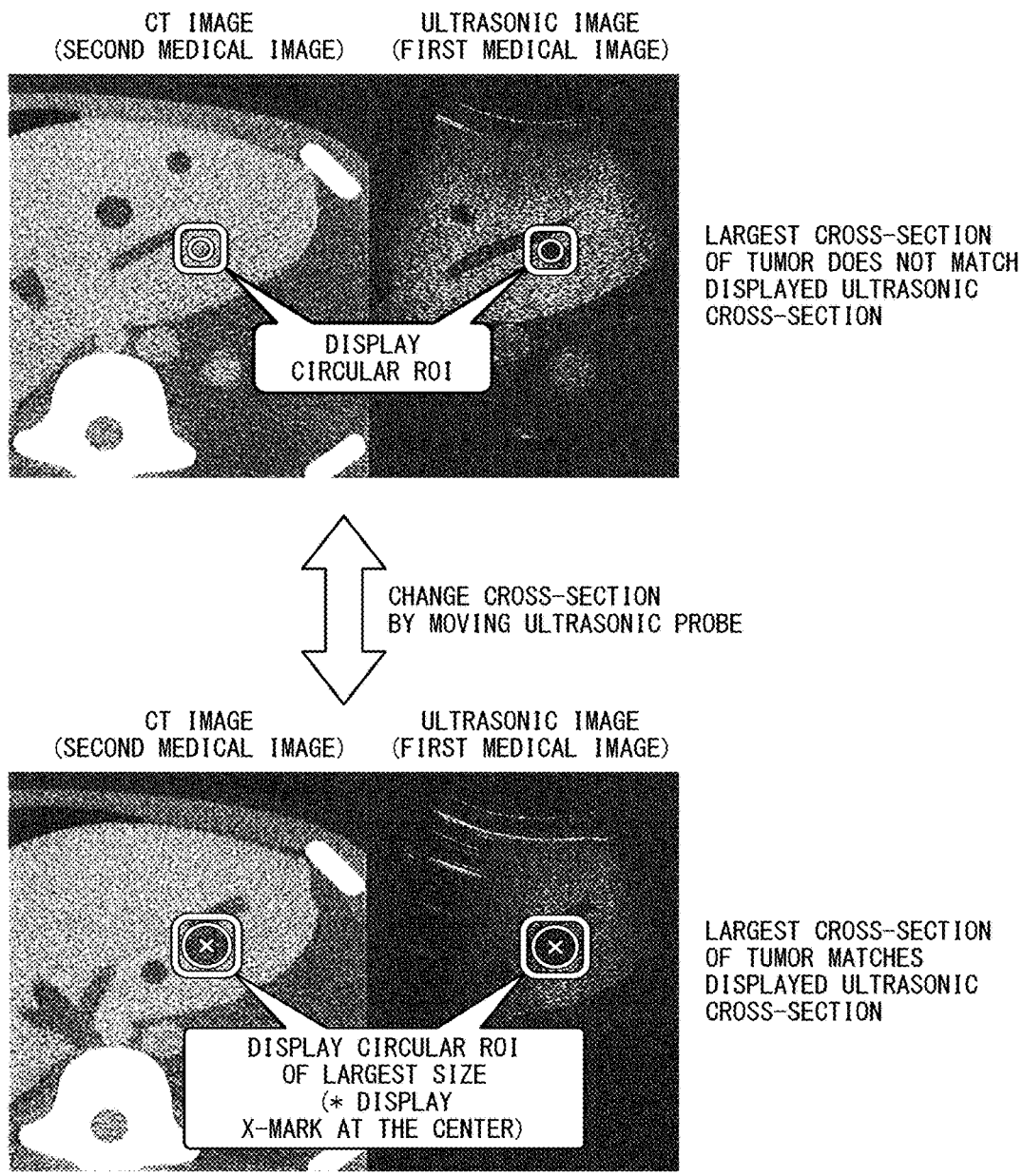
FIG. 8 is a schematic diagram illustrating superimposed images for easily recognizing the superimposed image in which the largest cross-section of a tumor is depicted.

FIG. 8 is a schematic diagram illustrating superimposed images for easily recognizing the superimposed image in which the largest cross-section of a tumor is depicted.

For instance, when a position of the largest cross-section of a tumor and a spherical ROI three-dimensionally surrounding this tumor are included in analysis information, a superimposed image may be generated by superimposing a circular image indicative of the position and outline of the ROI in the currently displayed two-dimensional ultrasonic image on this two-dimensional ultrasonic image.

In this case, when the currently displayed two-dimensional ultrasonic image cross-sectionally matches the largest cross-section of a tumor, it is preferable to perform an emphasized display. For instance, a circular image of the largest size is displayed and a mark is displayed in the center of the ROI as the emphasized display (see the X-mark on the image at the lower side of FIG. 8). Contrastively, when the currently displayed two-dimensional ultrasonic image does not match the largest cross-section of a tumor, the emphasized display is preferably hidden (see the image on the upper side of FIG. 8). As described above, presence/absence of the emphasized display is switched depending on whether or not the currently displayed two-dimensional ultrasonic image matches a predetermined cross-section such as the largest cross-section of a tumor and a cross-section for which various types of characteristic values have been measured. By switching presence/absence of the emphasized display in the above-described manner, a user can easily find the two-dimensional ultrasonic image matching a predetermined cross-section while moving the ultrasonic probe 11.

Aside from the cases described with FIG. 5 to FIG. 8, a superimposed image and a parallel image generated in the steps S2 and S3 in FIG. 4 respectively may be displayed in a variety of forms. For instance, consider a case where the first medical image is an image in which blood vessels are distinguishably depicted like a two-dimensional color Doppler image. In this case, an image indicative of analysis information to be superimposed on the first medical image may be, e.g., an image indicative of vessel segment number pointing a position of a cardiac coronary artery, an image indicating a blood vessel diameter, an image indicating a running position of a blood vessel, and an image indicating a branch position of a blood vessel.

Aside from the above images, for instance, an image indicating a planned ablation region in RFA (Radio Frequency Ablation) treatment for hepatic cancer, an image indicating annotation automatically added by another medical image diagnostic apparatus 101, an arrow indicating positional relationship between a tumor and blood vessels by distance value and a direction may be used in the image generation processing in the steps S2 and S3.

By superimposing at least one of the above-described images indicating analysis information on a two-dimensional ultrasonic image and displaying the superimposed image, the ultrasonic diagnostic apparatus 10 can assist a user in understanding positional relationship peculiar to an ultrasonic image. Thus, according to the ultrasonic diagnostic apparatus 10, for instance, a user can shorten time for finding the position at which the probe should be attached while parallel display is being performed. Additionally, when a color common to the second medical image and an ultrasonic image is assigned to each organ depicted in these two images in parallel display, a user can easily and accurately align these two images after rough alignment of these two images.

Next, an operation of the ultrasonic diagnostic apparatus 10 will be described by using a more detailed case than the flow of FIG. 4.

Figure 9:
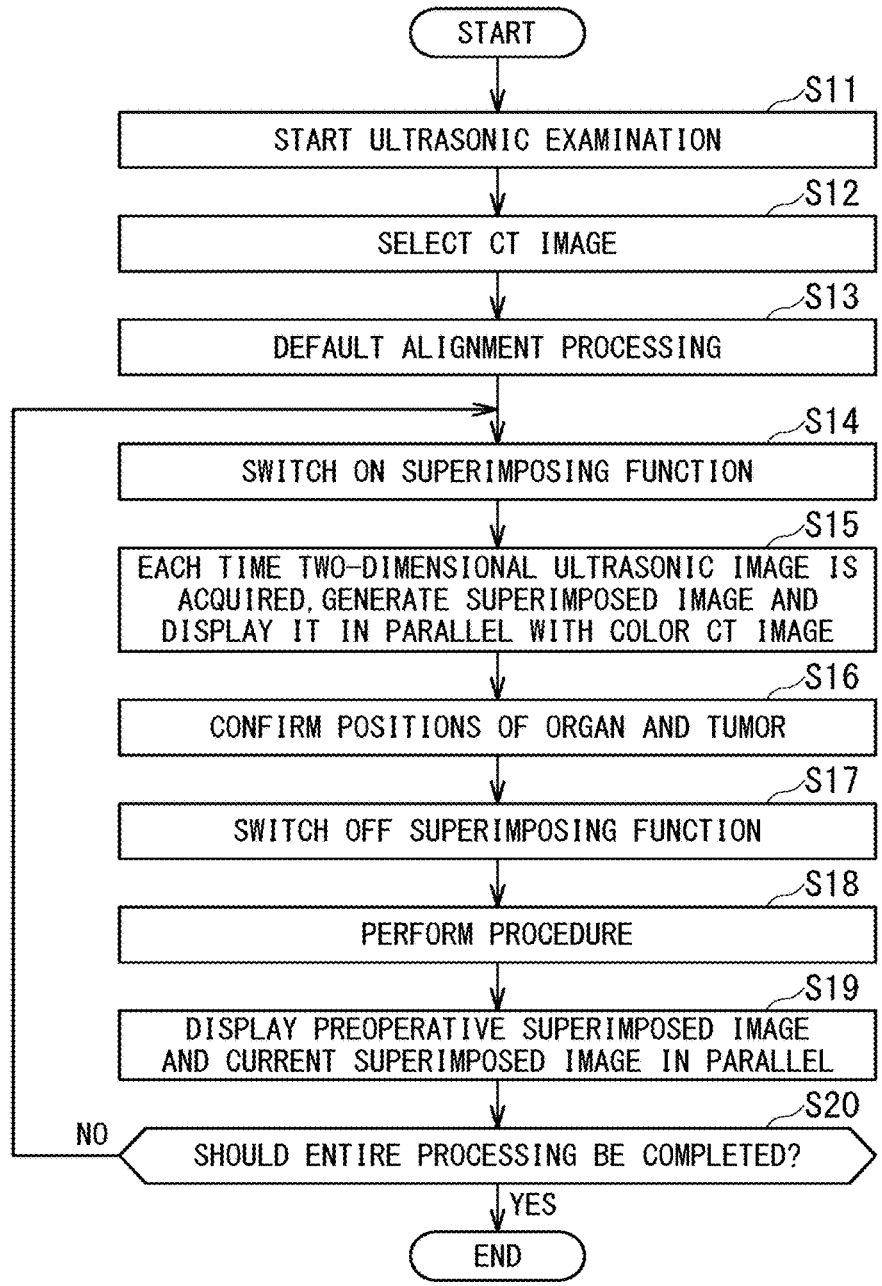
FIG. 9 is a flowchart illustrating an operation of the processor of the processing circuitry in ablation treatment for cancer.

FIG. 9 is a flowchart illustrating an operation of the processor of the processing circuitry 57 in ablation treatment for cancer. In FIG. 9, each reference sign consisting of S and number on its right side indicates each step of the flowchart.

Hereinafter, a description will be given of a case where the own apparatus is the ultrasonic diagnostic apparatus 10 and another medical image diagnostic apparatus 101 is an X-ray CT apparatus. The processing shown in FIG. 9 starts after the organ color information and CT volume data are stored in the memory circuitry 56 in advance.

The organ color information is assumed to be stored as one series of data. Additionally, it is assumed that one series of CT volume data include both of monochrome (i.e., gray-scale) data and color data in which each voxel is colored on the basis of the organ color information.

First, in the step S11, a user inputs a command to start an ultrasonic examination to the processing circuitry 57 via an input circuit.

Next, in the step S12, a user selects a CT image as the second medical image from data stored in the memory circuitry 56 via the input circuit. Consequently, the organ color information included in the CT volume data as the source of the selected CT image and the analysis information obtained by analyzing those CT volume data is identified.

Next, in the step S13, the alignment function 60 performs the default alignment processing, and associates the three-dimensional coordinates of the ultrasonic volume data whose origin is the transmitter with the three-dimensional coordinates of the CT volume data.

Next, in the step S14, the function of generating a superimposed image is switched on automatically or in response to a command inputted by a user via the input circuit.

Next, in the step S15, the cross-sectional image generation function 61 extracts the CT image corresponding to the cross-sectional position of the current two-dimensional ultrasonic image from the CT volume data, each time a time-sequential two-dimensional ultrasonic image is acquired in real time. In this extraction processing, the cross-sectional image generation function 61 extracts the color CT image, i.e., the CT image in which organs are colored on the basis of the organ color information. The superimposed-image generation function 64 superimposes an image for coloring each organ with the same color as the color indicated by organ color information on the current two-dimensional ultrasonic image. The display-image generation function 65 generates a parallel image in which the selected CT image and the superimposed image are arranged in parallel and causes the display 30 to display the parallel image (see FIG. 5). In the parallel image, each organ is colored with the color common to the CT image and the superimposed image so that organs can be distinguished from each other.

Next, in the step S16, a user observes the parallel image, and confirms the positions of the target organ and the tumor.

Next, in the step S17, a user switches off the function of generating a superimposed image via the input circuit. The function of generating a superimposed image may be automatically switched off when a command to start procedure is received via the input circuit, for instance. As the result, one side of the parallel image being displayed is changed from the superimposed image into the current two-dimensional ultrasonic image. By removing coloring superimposed on each two-dimensional ultrasonic image, the parallel image becomes an image by which a user can easily concentrate on procedure.

Also in this case, the other side of the parallel image being displayed (i.e., CT image) may be changed from a color image into a gray-scale image (see FIG. 3). By changing the CT image of the parallel image into an image with higher definition, the parallel image becomes an image by which a user can more easily concentrate on procedures. As described above, a display mode of the second medical image to be displayed in parallel with the first medical image may be switched according to progress condition of examination.

Next, in the step S18, a user performs procedures on the target tumor.

Next, in the step S19, the display-image generation function 65 causes the display 30 to display the preoperative superimposed image and the superimposed image based on the current two-dimensional ultrasonic image in parallel. By displaying the preoperative superimposed image and the superimposed image based on the current two-dimensional ultrasonic image in parallel, an effect of ablation, a puncture position, and a needle biopsy position can be easily confirmed. In other words, a user can easily confirm whether the procedure is performed as planned or not.

Next, in the step S20, the processing circuitry 57 determines whether a series of processing as described above is allowed to be completed or not. For instance, when a series of processing should not be completed like a case where an instruction indicative of further procedure to be performed is inputted by a user, the processing returns to the step S14. Contrastively, when a series of processing is allowed to be completed such as a case where a command to complete it is inputted by a user and a case where a further command is not inputted for a predetermined period of time, a series of processing is completed.

According to the above-described processes, the ultrasonic diagnostic apparatus 10 can assist a user so that a user can easily and precisely understand spatial positional relationship peculiar to an ultrasonic image. Additionally, by displaying a preoperative superimposed image and a superimposed image on the basis of the current two-dimensional ultrasonic image in parallel, a user can shorten time for confirming whether the procedure is performed as planned or not.

(Modifications)

Although a description has been given of a case where the own apparatus is an ultrasonic diagnostic apparatus in the above-described embodiment, the own apparatus is not limited to an ultrasonic diagnostic apparatus.

Figure 10:
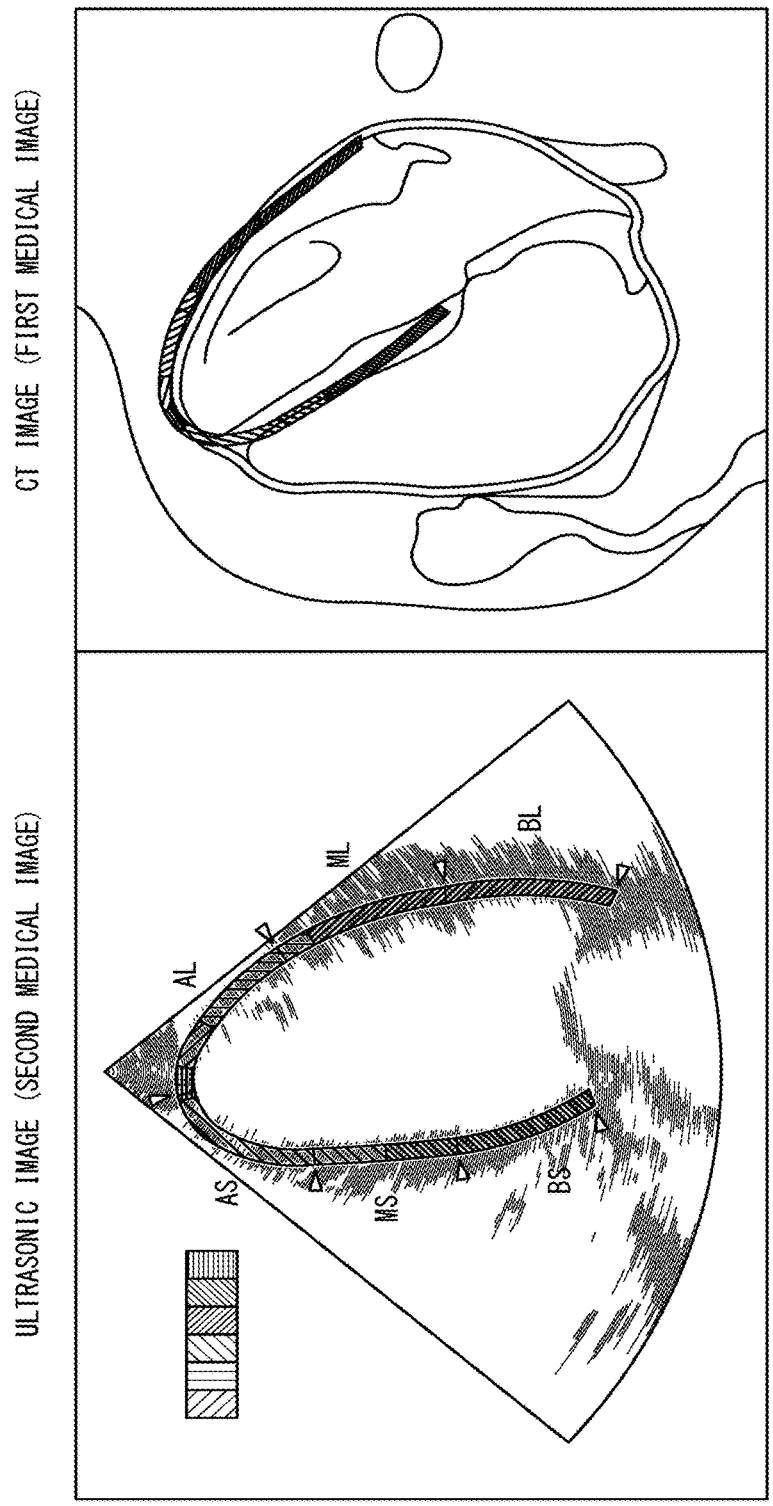
FIG. 10 illustrates a superimposed image and a parallel image when the own apparatus is an X-ray CT apparatus and another medical image diagnostic apparatus is an ultrasonic diagnostic apparatus.

FIG. 10 illustrates a superimposed image and a parallel image when the own apparatus is an X-ray CT apparatus and another medical image diagnostic apparatus 101 is an ultrasonic diagnostic apparatus.

An ultrasonic diagnostic apparatus as another medical image diagnostic apparatus 101 can perform, e.g., 3D-WMT (Three-Dimensional Wall Motion Tracking) on the heart of the object O included in ultrasonic volume data as the second volume data in some cases. In those cases, the superimposed-image generation function 64 of the X-ray CT apparatus as the own apparatus preferably generates a superimposed image by superimposing an image indicative of analysis information obtained as the result of 3D-WMT on the position of the heart depicted in a CT image as the first medical image (see FIG. 10). As the image indicative of analysis information used in the above generation processing, for instance, a map image of coloring based on intensity of wall motion and a map image of vectors according to intensity and direction of wall motion may be used.

Additionally, another superimposed image may be generated by superimposing the result of 3D-WMT on an ultrasonic image as the second medical image so as to display the superimposed image generated on the basis of the second medical image in parallel with the superimposed image based on the CT image. According to the superimposed image and the parallel image shown in FIG. 10, since a user can confirm analysis information obtained by analyzing ultrasonic volume data which cannot be obtained only from a CT image, a user can more easily understand a CT image.

According to at least one of the above-described embodiments, a medical image diagnostic apparatus (i.e., the own apparatus) can assist a user in easily understanding a medical image by superimposing information obtained by analyzing medical image data generated by a modality different from the own apparatus on the medical image generated by the own apparatus.

The processing circuitry 57 in the present embodiment is an example of the processing circuitry recited in the claims. Additionally, the touch input circuit 24 and the hardware key 22 of the touch panel 21 in the present embodiment are examples of the input circuit recited in the claims.

Further, the term "processor" used in the above-described embodiments means, e.g., a circuit such as a special-purpose or general-purpose CPU (Central Processing Unit), a special-purpose or general-purpose GPU (Graphics Processing Unit), an ASIC (Application Specific Integrated Circuit), a programmable logic device including an SPLD (Simple Programmable Logic Device) and a CPLD (Complex Programmable Logic Device), and an FPGA (Field Programmable Gate Array). A processor implements various types of functions by reading out programs stored in memory circuitry and executing the programs.

Moreover, programs may be directly installed in the circuit of the processor instead of storing programs in the memory circuitry. In this case, the processor implements various types of functions by reading out programs stored in its own circuit and executing the programs. Moreover, each function of the processing circuitry 57 may be implemented by processing circuitry configured of a single processor. Further, the processing circuitry 57 may be configured by combining plural processors independent of each other so that each function of the processing circuitry 57 is implemented by causing each processor to execute the corresponding program. When plural processors are provided for the processing circuitry 57, memory circuitry for storing the programs may be provided for each processor or one memory circuit may collectively store all the programs corresponding to all the processors.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A medical image diagnostic apparatus comprising:
processing circuitry configured to:
  acquire at least one piece of analysis information obtained by analyzing medical image data being generated by another medical image diagnostic apparatus of modality different from an ultrasonic diagnostic apparatus; and
  generate a superimposed image by superimposing an image indicating the at least one piece of analysis information on an ultrasonic image of the object generated by the ultrasonic diagnostic apparatus,
  acquire volume data as the medical image data from the another medical image diagnostic apparatus,
  align the volume data and the ultrasonic image generated by the ultrasonic diagnostic apparatus, wherein the analysis information includes information being set for the volume data on a planned puncture path of a puncture needle with respect to a target region of the object, generate the superimposed image by superimposing an image indicating a position of the planned puncture path in the ultrasonic image on the ultrasonic image, and cause the display to display the superimposed image.

2. A medical image diagnostic method comprising:

acquiring at least one piece of analysis information obtained by analyzing medical image data being generated by another medical image diagnostic apparatus of modality different from an ultrasonic diagnostic apparatus; and generating a superimposed image by superimposing an image indicating the at least one piece of analysis information on an ultrasonic image of the object generated by the ultrasonic diagnostic apparatus, acquiring volume data as the medical image data from the another medical image diagnostic apparatus, aligning the volume data and the ultrasonic image generated by the ultrasonic diagnostic apparatus, wherein the analysis information includes information being set for the volume data on a planned puncture path of a puncture needle with respect to a target region of the object, generating the superimposed image by superimposing an image indicating a position of the planned puncture path in the ultrasonic image on the ultrasonic image, and causing the display to display the superimposed image.

* * * * *